April 16, 1940.

S. CHINNICI 2,197,448

MACHINE FOR PRESSING SEAMS

Filed April 7, 1936

Inventor

Salvatore Chinnici

By Lloyd W. Patel

Attorney

April 16, 1940.  S. CHINNICI  2,197,448
MACHINE FOR PRESSING SEAMS
Filed April 7, 1936  8 Sheets-Sheet 7

Inventor
Salvatore Chinnici
By Lloyd W. Patch
Attorney

April 16, 1940.  S. CHINNICI  2,197,448
MACHINE FOR PRESSING SEAMS
Filed April 7, 1936   8 Sheets-Sheet 8

Inventor
Salvatore Chinnici
By Lloyd W. Patch
Attorney

Patented Apr. 16, 1940

2,197,448

UNITED STATES PATENT OFFICE 2,197,448

MACHINE FOR PRESSING SEAMS

Salvatore Chinnici, Vineland, N. J.

Application April 7, 1936, Serial No. 73,179

15 Claims. (Cl. 38—14)

My invention relates to machines for pressing seams, and particularly to means and a method adapted for use in pressing the seams of garments, such as the leg seams of trousers, sleeve seams of coats and other garments, longitudinal seams in coats, skirts and the like, and in fact in pressing any substantially long and more or less straight seam in any garment or other piece of fabric material.

A primary object is to provide a pressing machine of this character that is substantially automatic in operation, requiring manual control only to start forward and to initiate return movement of the pressing iron; it being a purpose to incorporate foot actuated control means so that the operator of the machine has both hands free with which to adjust and manipulate the cloth or garment or fabric upon the work support or pressing buck, thereby saving energy and time, and generally increasing the efficiency of the operator, as well as saving time and cost in the pressing operation.

Another object is to provide a machine particularly useful in pressing or finishing seams of newly made garments, where both hands of the operator must be free for handling, placement and manipulation of the garment or material, where rapid and efficient results are required, and where the garment must be finished in new condition and without production or showing of shine or gloss at the pressed seam or upon any adjacent portion of the garment.

A further object is to so construct the machine that a single operator can use both hands in placing, handling and manipulating the garment or fabric, and the operation of the machine can be entirely and exclusively controlled by the use of the operator's foot, only two foot operations being necessary, one to initiate or start movement of the forward or pressing cycle or operation, and a second manipulation to release the pressing iron from pressing position and to return the parts to the inoperative or starting position.

Still another purpose and object lies in the inclusion and the embodiment of automatically operated means and mechanism of such character that when operation is initiated the seam will be opened or smoothed under very slight pressure, the material will be moistened along the line of the seam, the pressing iron will be carried to a position adjacent to and over the seam, and then direct pressure will be automatically applied through said iron to dry and press the smoothed material without moving or sliding the pressing iron laterally over the material; and then, the operator can trip or reset the automatic control means to lift the pressing iron bodily from the material, without sliding the iron or moving the same laterally over the goods, and to return the parts to the starting position.

With the above and other objects in view, which will be apparent to those skilled in the art, my invention includes certain novel features of construction and combinations and arrangements of parts, and certain steps and procedures in carrying out the method, which will be hereinafter more fully set forth in connection with the drawings and then pointed out in the claims.

The supporting frame structure is made up to be of elongated form and is carried by the supporting legs 1, the frame structure including the longitudinally extending top supporting bars 2, transverse supporting bars as indicated at 3 and 4, and such other and necessary longitudinal and transverse and vertical bars or frame members as may be desirable and advantageous. In the present instance I have shown this frame structure and the various frame members as being made up of usual forms of bars, angles and channels, but it will of course be understood that the leg members 1 can be cast or otherwise formed to be of any desired and convenient shape, and that the frame structure can be made up and can be assembled in any desired construction and arrangement which will serve the purposes of use.

Figure 1:
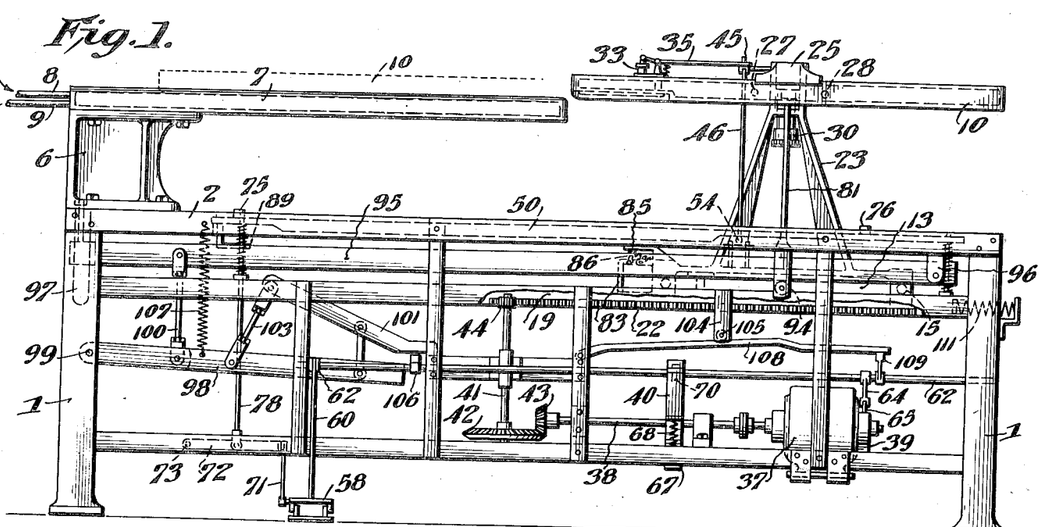
Figure 1 is a view in side elevation of a machine embodying my apparatus and adapted for use in carrying out my method, the illustration showing the machine from the front side.
Figure 2:
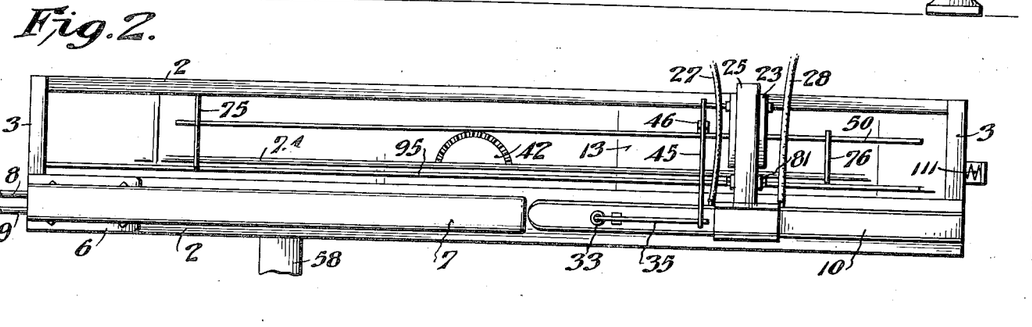
Fig. 2 is a top plan view.
Figure 3:
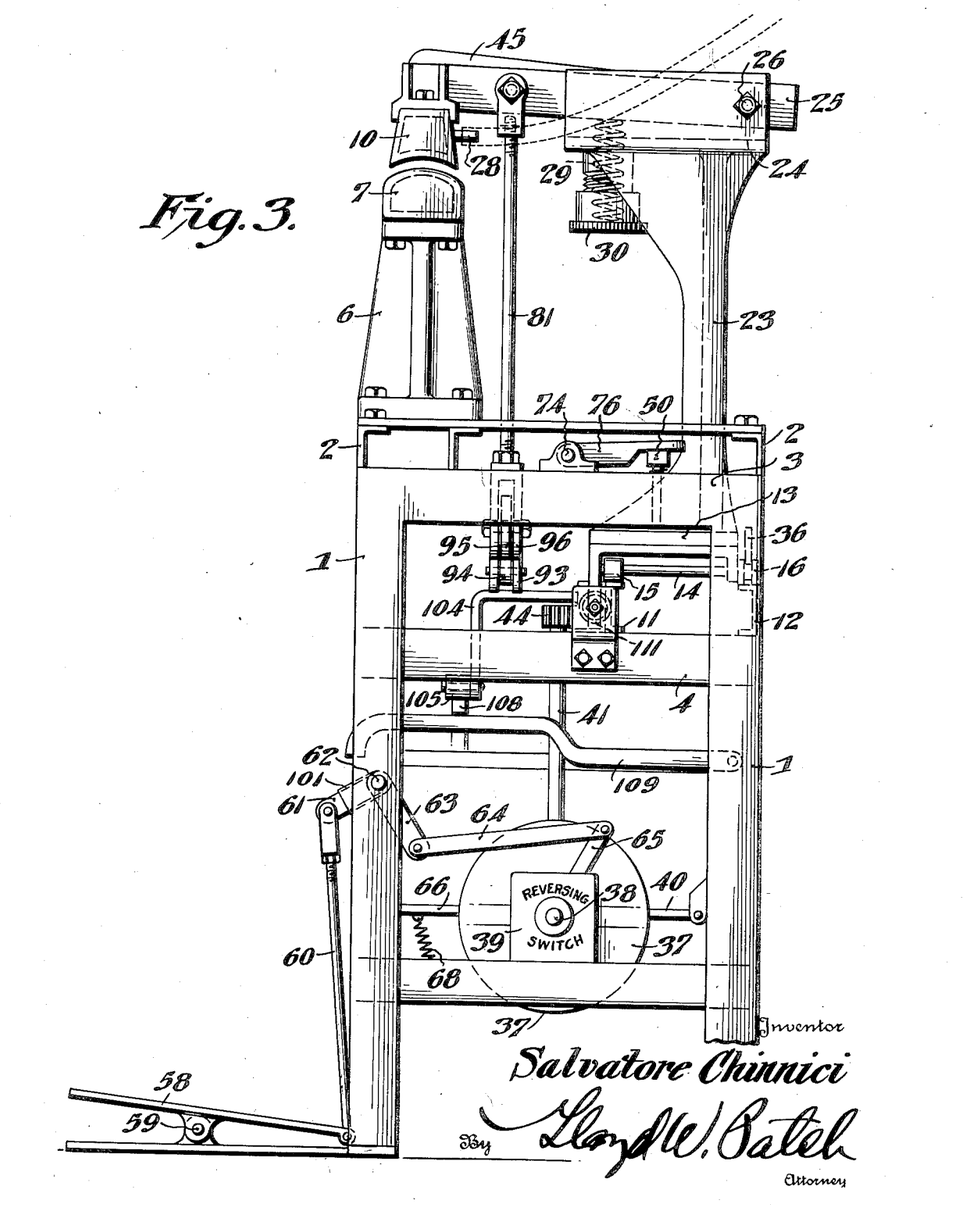
Fig. 3 is an enlarged view in end elevation showing the machine as it appears when viewed from the right hand end of the disclosure in Figure 1.

The disclosure in Fig. 1 shows a machine constructed in accordance with my invention and adapted to carry out my improved method, and the illustration is taken from the forward or operating side of the machine. A standard 6 is stationarily and rigidly mounted at one end and adjacent to the forward side of the supporting frame structure, to be carried by the longitudinal top bars 2, and upon this standard 6 a pressing buck 7 is stationarily and rigidly mounted. This pressing buck is preferably made of hollow construction and is elongated, the pressing buck being preferably curved or rounded transversely, as illustrated in Fig. 3. This pressing buck 7 is mounted upon the standard 6 with one end extending inwardly over the middle portion of the supporting frame, and thus the pressing buck is presented as an elongated rounded portion adapted to serve as a pressing or ironing board, and over which the leg of a pair of trousers, the sleeve of a coat, or in fact any other seamed garment or material can be placed with the seamed edges presented uppermost or outwardly. The upper or pressing surface of this pressing buck 7 can be fitted with a canvas cover, can be padded, or can be otherwise treated or covered to give a suitable and satisfactory pressing surface, and the purpose in making the pressing buck 7 hollow is to permit heating thereof. Steam inlet and outlet pipes 8 and 9 are connected at the outer end of the pressing buck 7 in communication with the hollow interior, and thus by making connection with a suitable source of steam supply the pressing buck 7 can be heated to any desired temperature. The inner or extending end of this pressing buck 7 is preferably rounded over to permit the edge of the material at one end of the seam to be drawn down so that this edge will be slightly below the main top portion of the pressing buck 7.

As stated, the pressing buck 7 is stationarily mounted adjacent to the forward side and one end of the elongated supporting frame structure, and the pressing iron 10 must be manipulated and must travel and function relatively with respect to this positioning and mounting of the pressing buck, and must at the same time be actuated to entirely clear the pressing buck to permit placement and removal of the seamed material to be held and supported thereon during the seam opening or smoothing and pressing operations. The supporting frame has trackways 11 and 12 mounted longitudinally thereof to be carried by transverse bars 4, or other parts of the supporting frame structure, preferably below the top supporting bars 2 and preferably rearwardly upon the longitudinal extent of the frame. A carriage structure 13 has mounted at its ends, and extending transversely, the axles 14 which have thereon carrying wheels 15 and 16. These carrying wheels 15 and 16 are adapted to support the carriage 13 for traveling movement longitudinally of the frame structure upon the track rails 11 and 12, and a side flange of the carriage depends downwardly along the outer side of track rail 11. Rollers 18 are provided to bear against the outer side of track rail 11 and to reduce lateral friction and prevent lateral displacement. A rack bar 19 is fitted upon the flange portion 17 of the carriage and is provided with elongated slotted openings 20 through which pins 21 on the carriage are slidably received. This rack bar has rack teeth provided at 22, and the bar is made sufficiently long to accommodate a full length of travel as desired for the carriage.

A pressing iron supporting standard 23 extends or is mounted in upright relation upon the carriage 13 so that it will travel between longitudinal frame members 2 and will have free travel in a line behind the position of mounting of the pressing buck 7 when the carriage is moved. This iron supporting standard 23 has its upper end widened out forwardly and the widened end is bifurcated to provide a guideway 24 extending from front to back of the support. A pressing iron carrying bar 25 is pivotally or swingably mounted in this guideway 24 by a pivot bolt or pin 26, and this pressing iron supporting bar 25 carries the hollow elongated pressing iron 10 at its forward end, which iron is thus disposed and held in a longitudinal line substantially parallel with the pressing buck 7 and relatively substantially vertically above or over the pressing buck 7.

As illustrated in Fig. 3, the hollow pressing iron 10 has its lower pressing face substantially concave to thus approximately fit and conform to the convex or transversely rounded pressing face of the pressing buck 7, and the pressing iron will be made of a transverse width sufficient to press upon and cover the entire seamed edges and as much of the material on each side laterally from the seam as may be found desirable. The pressing iron is made hollow and is provided with steam inlet and outlet connections at 27 and 28, or at any other desired and suitable point which will not interfere with the movement and manipulation of the iron, so that the iron can be heated to any desired temperature. It is preferable that the connections to the steam inlet and outlet passages be made by means of flexible hose or tubing to thus allow free manipulation and movement, but it will of course be understood that the iron can be heated in any other desired or approved manner, as by the use of electricity, gas flames, or the like.

As illustrated in Fig. 3, a spring 29 is provided upon the pressing iron supporting standard 23 to exert resilient force upon the swinging arm 25 to thus normally hold the hollow pressing iron 10 in a position in which it is raised above the top plane of the pressing face of the pressing buck 7, an adjusting cap 30 being preferably provided to regulate the bearing force exerted by the spring 29.

Figure 7:
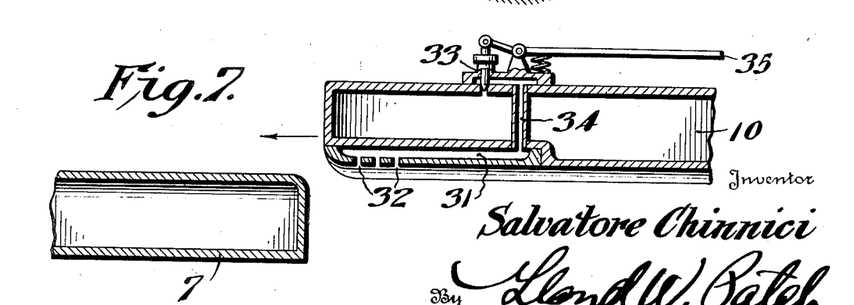
Fig. 7 is a fragmentary view, partly in section, showing the seam moistening control means.

As shown in Fig. 7, the hollow pressing iron has a wet steam or moistening steam passage and chamber 31 near the forward end and adjacent to the lower face and communicating steam or moisture escape openings or passages 32 are provided through the pressing face of the pressing iron, substantially centered and aligned longitudinally with respect to the pressing face of the nose of the iron. It is desired that steam or moisture be applied only at certain times during the operation of the machine, and consequently the chamber 31 must be separated from the hollow opening in the body of the iron and steam must be admitted thereto only at certain intervals. To accomplish admission of steam I provide a normally closed valve 33 in an inlet or passage 34 establishing communication from the main body portion of the iron to the moistening or steam chamber 31. As stated, this valve will be normally closed, and a handle or lever 35 is provided to be depressed when it is desired that the valve be opened to permit flow of steam from the main hollow body of the iron through passage 34 into chamber 31, and consequently to permit escape of steam through the moistening openings 32.

As has been hereinbefore described, the carriage 13 is mounted on wheels 15 and 16 traveling on tracks 11 and 12, and as the arm 25 and the pressing iron 10 are extended laterally toward the front of the machine, there is a tendency toward the iron supporting standard 23 to exert a tilting force upon the carriage. To resist this tilting of the carriage and to insure that the carriage will at all times travel properly upon the tracks 11 and 12, the wheel 16 is grooved on its bearing face and a track member 36 is provided on the upper side of this wheel 16 to fit within the groove of the wheel and to prevent upward tilting movement of the carriage due to the upsetting or overbalanced weight of the iron.

A motor 37, receiving electricity from any suitable source, or any other suitable power unit, is mounted upon the frame structure and is provided with a drive shaft 38. A control switch generally indicated at 39 is provided for the motor, and a brake 40 is associated with the drive shaft 38. A driven shaft 41 is journalled in suitable bearings upon the frame structure and through miter gear 42 and miter pinion 43 a driving connection is established from the drive shaft 38 to the driven shaft 41. As illustrated in Figure 1, it is perhaps desirable that the gearing be of the speed reducing type to thus slow the rotation of shaft 41. This driven shaft 41 has a pinion 44 on its upper end which pinion is in mesh with the teeth 22 of the rack bar 19. The motor or power unit 37 is of reversible type, and the switch 39 is also of such construction that the motor can be started in forward rotation, can be stopped in neutral position, and can be started in reverse rotation, the brake 40 being of such construction that it will function efficiently upon both forward and reverse rotation of shaft 38. By this arrangement of power means, it is possible to move the carriage 13 longitudinally in forward and return movement upon the trackways 11 and 12, as the tooth portion 22 of the rack bar 19 is made sufficiently long to permit such movement due to forward and reverse rotation of shaft 41 and consequently through the gear pinion 44.

Figure 16:
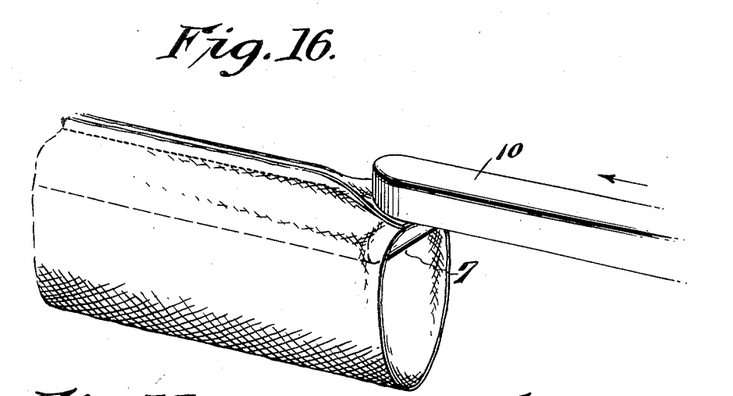
Fig. 16 is a fragmentary broken view showing the manner of fitting a trousers leg upon the pressing buck and opening the seamed edges.
Figure 17:
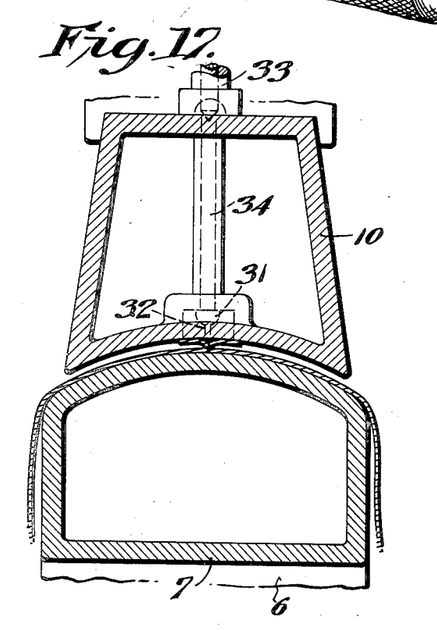
Fig. 17 is a fragmentary transverse sectional view showing the seamed fabric in place upon the pressing buck and illustrating the relation of the parts when the iron has been moved to open and smooth the seam.
Figure 18:
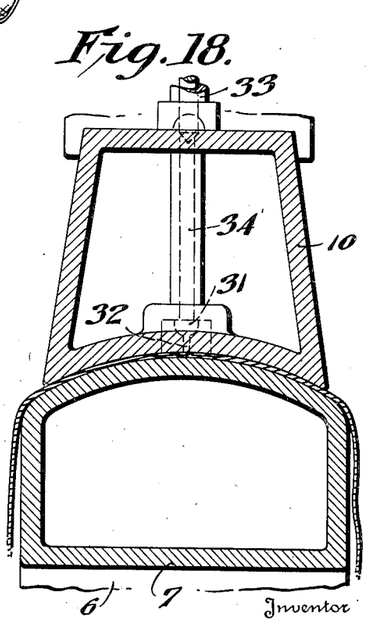
Fig. 18 is a view similar to Fig. 17 illustrating the position of the parts and the carrying out of the step of applying direct pressure to press the smoothed seam.

The forward movement of the carriage 13 is to be accomplished with the pressing iron 10 raised to be spaced above the top of the pressing buck 7, substantially as illustrated in Fig. 17, so that as the seamed material is placed upon the pressing buck 7 and the pressing iron 10 moves longitudinally along the length of the pressing buck, the two edges of the seamed material will be opened or spread back, as shown in Fig. 16, and these edges will be smoothed down against the main portions of the material on each side of the seam, without the exertion of sufficient force to press the seam, and also without sliding the iron over and in pressing contact with the material, which sliding of the iron while in pressing contact will produce shine and will cause uneven heating and pressing. As shown in Fig. 17, the moistening openings 32 are so located that they will substantially center upon the line of stitching between the seamed edges of the material, and consequently as steam escapes through these openings 32 the material will be moistened along the line of the seam. As wet steam is used, the steam escaping under pressure will penetrate the material to moisten the fabrics and the yarn or thread thereof, and the degree and quantity of moistening can be regulated by providing a greater or lesser number of steam escape openings. Further, should it be desired to moisten the seamed edges over a wider area, the openings 32 can be made as slots, can be staggered or spread laterally, or can be arranged or formed in any other desired manner, such construction being well within the knowledge of an ordinary mechanic and being not here particularly illustrated.

Figures 5, 6:
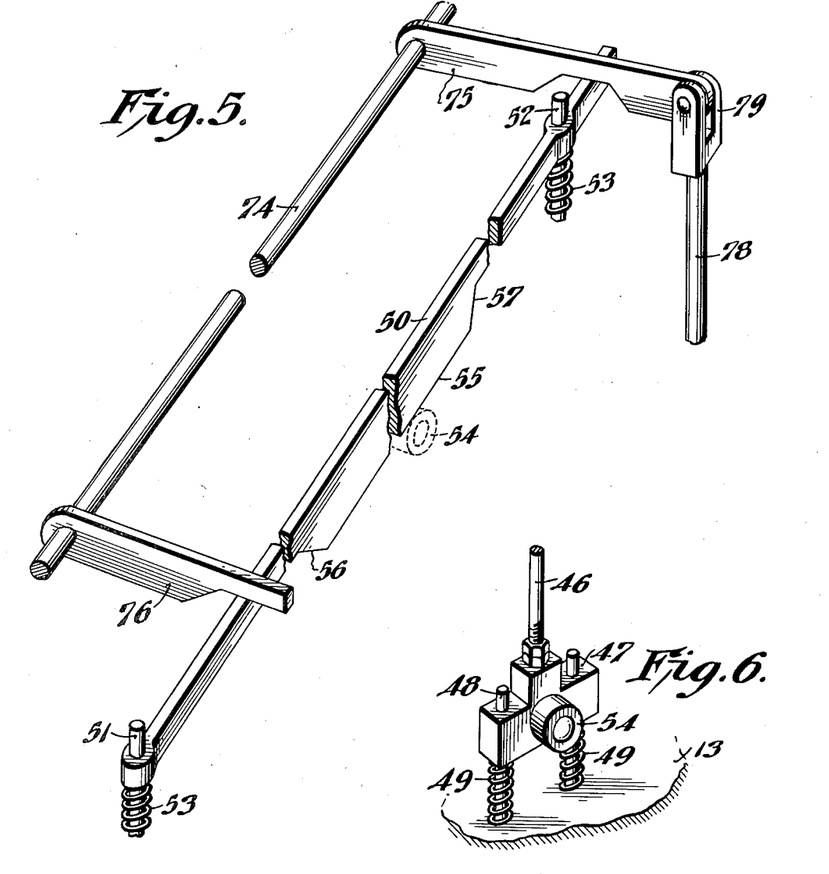
Fig. 5 is a fragmentary perspective view illustrating the seam moistening control means.
Fig. 6 is a fragmentary perspective view illustrating the moistening valve control rod.
Figure 8:
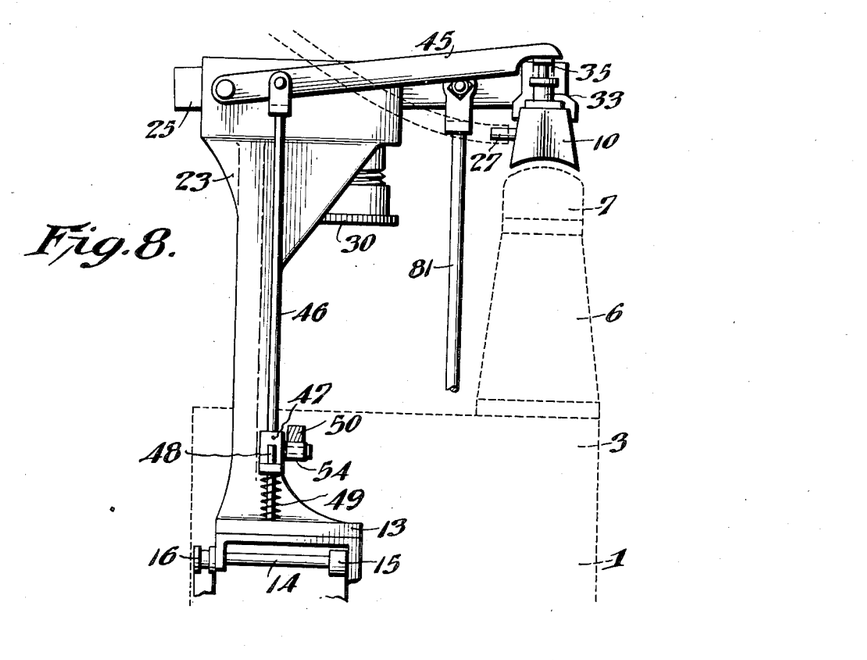
Fig. 8 is a fragmentary sectional view showing the leverage arrangement for the seam moistening control mechanism.
Figure 9:
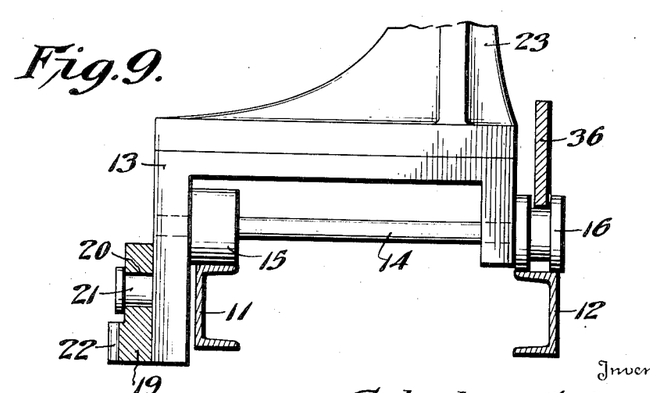
Fig. 9 is a fragmentary view to show the carriage mounting.
Figure 10:
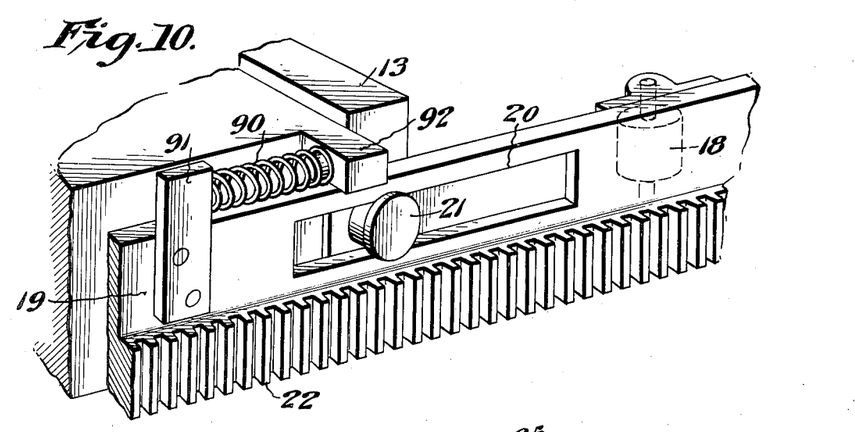
Fig. 10 is a fragmentary perspective view illustrating the mounting of the iron supporting standard upon the carriage.

It is desirable that the steam escape through the openings 32 to moisten material only during forward travel of the pressing iron while the seamed edges are being spread and smoothed, and with this in mind I provide steam control means as better illustrated in Figs. 5, 6 and 8. An arm 45 is swingably mounted on the pressing iron supporting standard 23 and has one end thereof extended to rest upon the outer end of lever 35 by which the steam valve 33 is opened. A draw link 46 is connected with this arm 45 at a point spaced from the pivot or swinging mounting of the arm, and at its lower end this draw link 46 has a cross head 47 slidably received on pins 48. These pins 48 which are mounted upon a part of the carriage 13 have springs 49 thereon normally exerting resilient pressure against the cross head 47 to push up the link 46 and consequently raise the arm 45. A steam valve control bar 50 is disposed longitudinally upon the frame and is slidably mounted at its ends upon upright pins 51 and 52 which pins are mounted on the supporting frame structure. Coil springs 53 are provided around the lower portions of the slide pins 51 and 52 to normally exert pressure to raise the bar 50. This bar 50 is disposed to be closely adjacent to the path of movement of the cross head 47, as the carriage 13 is moved longitudinally upon the frame, and the cross head has a bearing roller 54 extending laterally therefrom to travel beneath the lower edge of the bar 50. This bar 50 has the middle portion thereof widened downwardly, as at 55, and this widened portion has its ends tapered as at 56 and 57.

A treadle 58 is provided on the forward side of the frame and is located to be conveniently accessible to the foot of an operator when standing in position to readily place and handle seamed garments or fabrics upon the pressing buck 7. This treadle is pivoted or swingably mounted at 59 to thus be capable of rocking movement both upwardly and downwardly at its inner end, the treadle being consequently of the double acting type. This treadle has a link 60 at the inner end thereof connected with an arm 61 on a control shaft 62 which is journalled in bearings to extend longitudinally along the frame and adjacent to the brake 40 and the switch 39. An arm 63 on this shaft 62 is connected by a link 64 with the switch arm 65 of the starting and reversing switch 38, and as the forward end of the treadle 58 is depressed the link 60 draws upon arm 61 and rocks the shaft 62 to throw the switch arm 65 to a position to connect the motor with the source of current for forward rotation and operation of the motor.

The brake 40 has a brake band 66 normally held against a brake drum 67 on the drive shaft 38 by means of a pull spring 68, and this brake band or shoe 66 has an extension arm 69 projecting therefrom to a position adjacent to the control shaft 62. A brake releasing cam 70 is mounted on the control shaft 62 in position to engage with the arm 69 when the shaft 62 is rocked to actuate the switch arm 65 for either forward or reverse operation of the motor 37, and thus as the treadle 58 is swung downwardly at its forward end current is supplied to the motor for forward operation of the same and the brake 40 is released so that the drive shaft 38 can rotate and can impart rotary motion to the driven shaft 41 to cause the pinion 44 engaging with the teeth 22 of the rack bar to move the carriage toward the right hand end of the frame, as the parts are illustrated in Figure 1, this being herein referred to as forward movement. This forward travel of the carriage moves the pressing iron 10 longitudinally above and substantially parallel with the pressing face of the pressing buck 7, and as has been stated, it is desirable that the face of the pressing iron be sufficiently spaced above the face of the pressing buck to avoid pressing of the material, this spacing or separation being shown in Figs. 3 and 16 and 17. However, it is desirable that the steam supply to the steam escape openings 32 be established almost immediately upon this forward movement of the pressing iron, and as the steam valve 33 is opened by pull exerted upon rod 46, it is necessary that the steam control bar 50 be sufficiently lowered against the pressure of springs 53 to engage the roller 54 and exert the required pulling pressure upon link or rod 46.

A link 71 is connected with the forward end of the treadle 58 and is connected with the outer end of an arm 72 extending laterally from a shaft 73 journalled transversely in suitable bearings upon the frame. A shaft 74 is journalled longitudinally upon the frame structure adjacent to the steam control rod or bar 50, and arms 75 and 76 extending from and fixed upon this shaft 74 engage with the upper side or edge of the steam control bar 50 adjacent to its ends. The shaft 73 has a second arm 77 extending radially therefrom and a draw rod or link 78 connected with this arm 77 is pivotally connected at 79 with the outer end of the arm 75. Through slot 80, or other appropriate and suitable lost motion means or formations, the rod or link 78 is connected only as a draw link, and this link and the arms 75 and 76 will in no way serve to raise the bar 50, such raising movement being accomplished by the springs 53. As the treadle 58 has its forward end swung downwardly the rod 78 will swing the arms 75 and 76 downwardly to lower the bar 50 into such position that the cam portion 55 thereof will engage the roller 54 and will swing the arm 35 to open the steam valve 33. The cam end 57 engages the roller 54 after the iron 10 has traveled a sufficient forward distance to bring the moistening openings 32 over the goods or garment support as held upon the pressing buck 7, and the main body 55 of the cam portion will hold the moistening valve 33 open substantially until the iron 10 reaches the end of its forward travel, at which point the roller 54 will travel down the cam end 57 and the drawing force on rod or link 46 will be relieved so that arm 35 is free to rise to permit valve 33 to close, thus cutting off the supply of steam through the moistening openings 32. The pressing iron then is in substantially the position shown in Fig. 17, the two edges of the seamed material having been spread and smoothed back, but the iron being sufficiently spaced from the pressing buck to avoid the exertion of pressing force while the pressing iron is being moved.

When the pressing iron has been carried to its full position over the material upon the pressing buck and travel of the iron has been stopped, my machine and method contemplate the application and exertion of direct force upon the heated pressing iron to press and dry the material held and supported upon the pressing buck, without lateral or endwise sliding movement of the pressing iron. This direct application of pressing force to the pressing iron is accomplished by rocking the arm 25 around its pivot or swinging mounting 26 to thus lower the pressing iron 10 toward and to cause pressing pressure upon the material supported upon the pressing buck, this pressing position being illustrated in Fig. 17.

Figure 11:
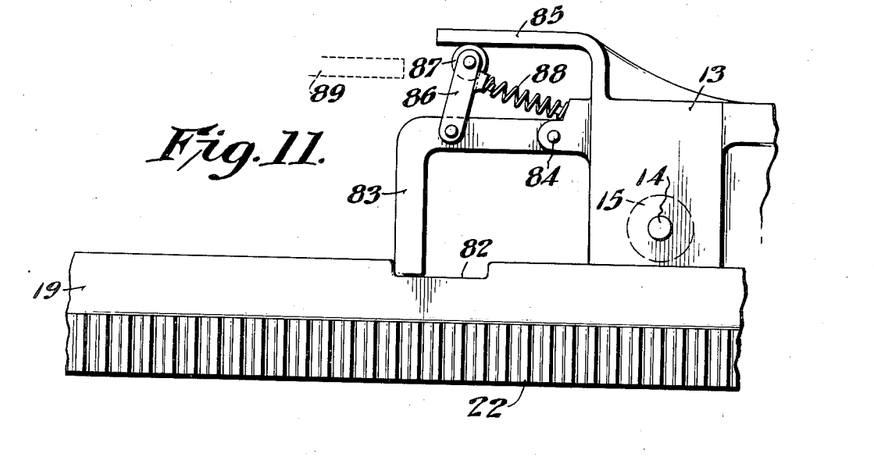
Fig. 11 is a fragmentary side elevation of the releasable means by which the iron supporting standard is locked upon the carriage.
Figure 12:
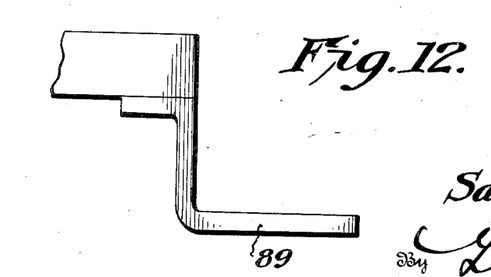
Fig. 12 is a fragmentary view showing the trip to release the iron supporting standard from its locked fixed relation upon the carriage.
Figure 13:
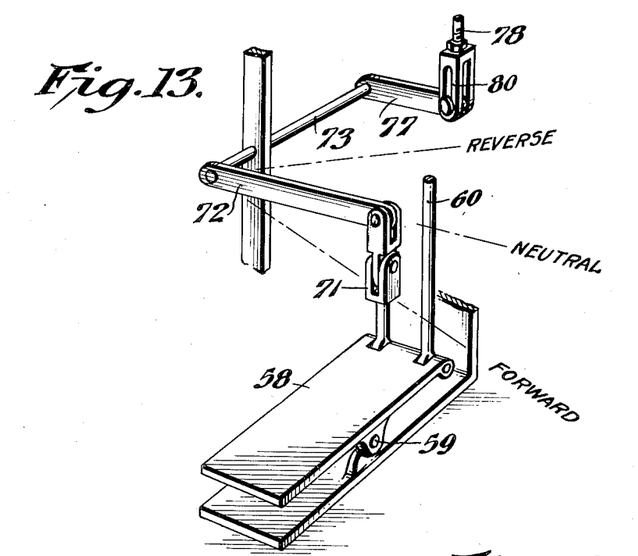
Fig. 13 is a perspective view showing the foot treadle and parts of the operating and control linkage and leverage.
Figures 14, 15:
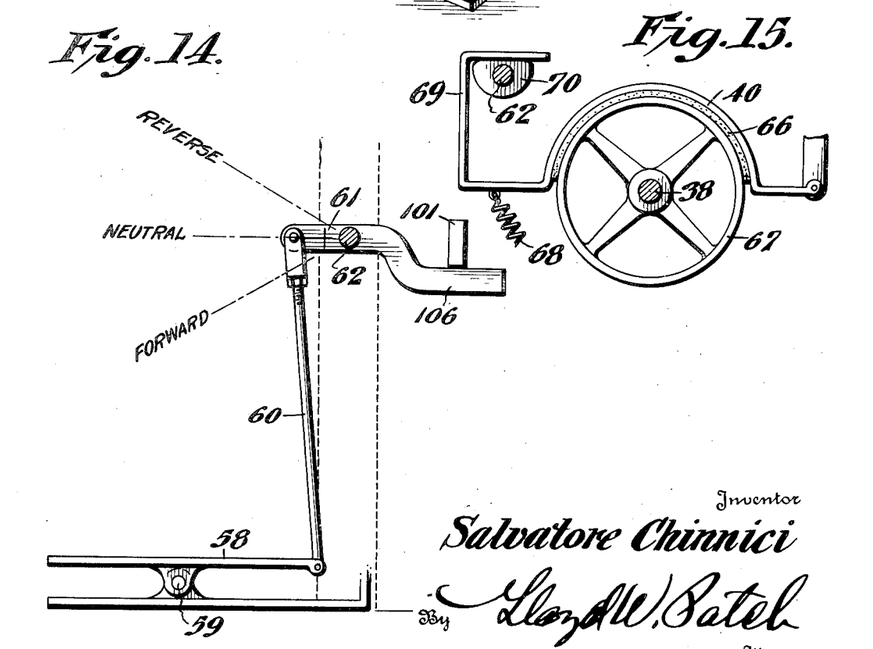
Fig. 14 is a fragmentary view in elevation to better show parts of the foot actuated control mechanism.
Fig. 15 is a fragmentary view in elevation showing the brake means.

The arm 25 is readily swung by means of a draw link or rod 81, and when pulling force is exerted upon this link or rod the pressing iron will be clamped down with direct pressing force and pressure. This pull upon the rod 81 is readily accomplished through force resultant from the travel of the carriage 13; but, as above stated, it is a primary purpose of my invention that this pressure shall not be applied to the pressing iron while the iron is moving over the goods or garment, and consequently it is necessary that the movement of the iron be stopped and the movement of the carriage be continued, to accomplish the pressing force from the moving carriage. With this purpose in view, the rack bar 19, which normally travels with the carriage is associated with the main parts of the carriage to permit slight longitudinal movement, through the slot 20, and it is therefore desirable that lock or latch means be provided, as best shown in Fig. 11, to normally hold the rack bar 19 against independent movement and to yet permit continued movement of this rack bar when the pressing iron 10 has been brought to the end of its forward stroke. The rack bar 22 has a notch or groove 82 in its upper edge adjacent to the forward end of the body of the carriage 13, and a latch member 83 is pivotally and swingably mounted at 84 on the body of the carriage. An extension arm 85 is provided on the carriage 13 to extend forwardly over the latch member 83, and a toggle link 86 swingably connected to extend upwardly from the latch member 83 has a roller 87 on the free end thereof to engage with this extension bar 85. A pressure spring 88 is mounted on the rear side of the toggle link 86 to normally exert resilient force to swing the link to bring the roller 87 into bearing against the inner side of the extension bar 85, and thus the toggle link normally exerts pressure to move the latch member 83 downwardly into recess or notch 82 and to hold this latch member in this latched position so that the rack bar 19 and the main body of the carriage 13 are coupled to move together. A latch releasing trip bar 89 is carried by a suitable portion of the frame at a point to engage the toggle link 86 and swing this link back and at the same time exert swinging force upon the latch member 83 to raise this latch member and release the same. It is desirable that a spring 90 be provided between extensions 91 and 92 on the rack bar 19 and the carriage body portion, to thus cushion between these two portions when return movement of the rack bar is initiated, which return movement will remove the toggle link 86 from proximity to the latch tripping bar 89 and will permit the latch to again engage in the recess 82 to lock the bar and the carriage structure to travel together.

Figure 4:
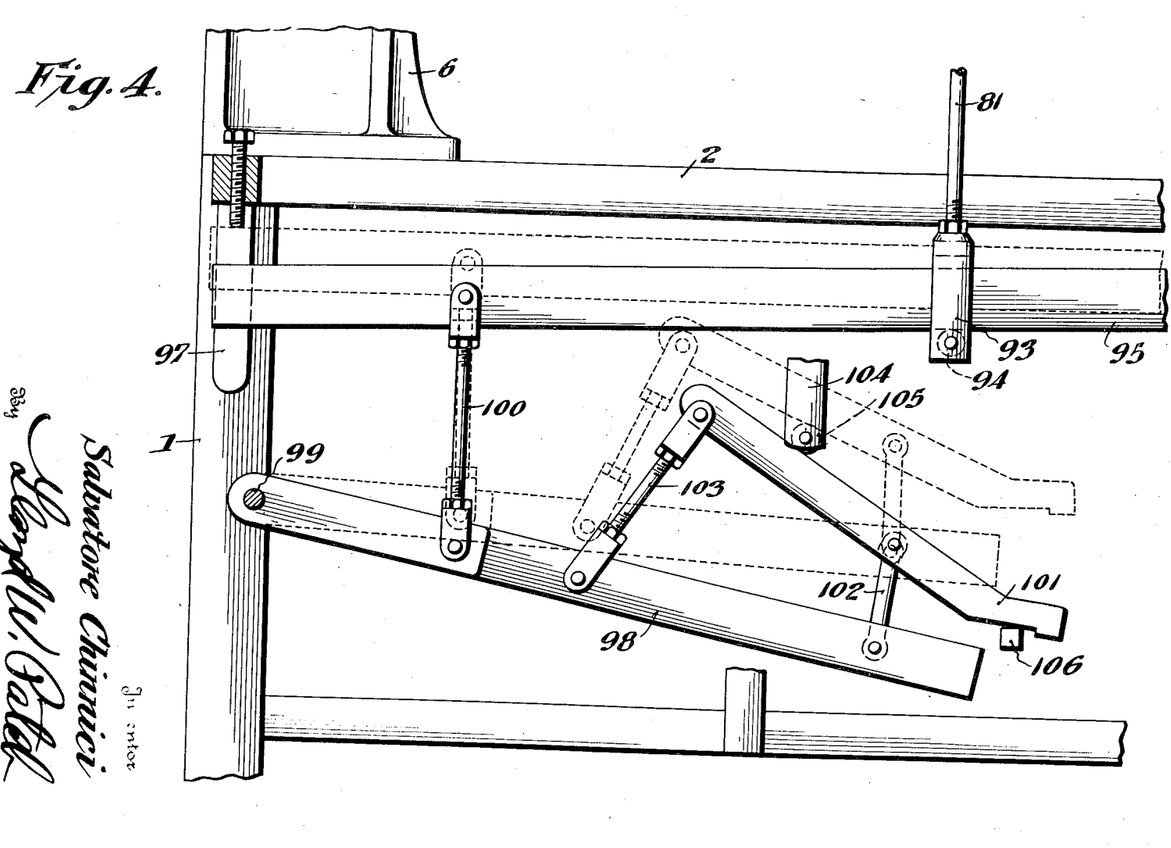
Fig. 4 is a fragmentary view showing the pressing shift means.

With the link structure as shown in Fig. 4, it is possible to exert a considerable pulling force upon the rod 81, and to thus obtain the desired clamping and pressing force upon the pressing iron 10. This rod 81 has at its lower end a stirrup 93 which has mounted therein a roller 94. A pressure bar 95 is pivoted at 96, adjacent to the right hand end of the machine and extends in normally substantially horizontal relation approximately to the left hand end of the machine frame, this rod being swingably mounted upon its pivot 96 and being guided at its free end by guide members 97 to thus be held against lateral twisting or shifting. The stirrup 93 of the rod 81 is fitted around this pressure rod 95 and the roller 94 is in position to engage the lower edge of the bar 95. A lever 98 is swingably mounted at one end, as at 99, upon the frame structure and has its free end extending normally substantially horizontally. A link 100 is pivotally connected at one end with the free swinging end of pressure lever 95, and at its other end is connected with the lever 98 at a point spaced from the swinging mounting at 99. A cam bar 101 is pivotally connected in its middle portion with a link 102 which is connected adjacent to the free end of lever 98, and an adjustable link or connecting rod 103 is connected with the middle portion of this lever 98 and with one end of the cam bar 101, to dispose this cam bar at an upwardly inclined relation with respect to the lever 98. It is preferable that the links or rods 100 and 103 be made adjustable so that the parts can be adjusted to suit the requirements of the particular use to which the machine is being put. An extension arm 104 depends from the rack bar 19, and this extension arm has at its lower end a roller 105. The parts are so constructed and positioned and mounted that, as the latch member 83 is released and the rack bar 19 continues its forward travel, the wheel or roller 105 will engage at the upper inclined edge of cam bar 101, and the associated parts will then be moved from the dotted line position as shown in Fig. 4 to the full line position of this figure. It will be seen that the pressure bar 95 is swung down and as this bar engages the roller 94 mounted in the stirrup 93, a powerful drag or drawing force is exerted through rod 81 to swing arm 25 downwardly and to consequently lower the pressing iron 10 against the material held and supported on the pressing buck.

At the same time, means must be provided to stop forward movement of the rack bar portion of the carriage so that the pressing iron will not be moved, and this is accomplished by providing an arm 106 on the control shaft 62, which arm is positioned to be engaged by the cam bar 101. When the cam bar engages the arm 106, the shaft 62 is moved to a position in which the switch 39 is in the neutral or off position, and the cam portion 70 of the brake mechanism is also brought to a neutral position to permit the brake shoe or band 66 to frictionally engage the brake drum 67 and thus substantially immediately stop rotation of the shaft 38 and hold the various moving parts of the machine in this position.

As the pressing iron 10 and the pressing buck 7 are heated and a powerful pressing force is exerted directly by the pressing iron 10, the seam of the garment or material will be flattened and dried and pressed and set, and at the same time all possibility of production of shine due to moving parts is avoided as a direct pressure is employed in the pressing operation.

As stated, the foot treadle 58 is adapted to swing to two different operative positions, and when the operator manipulates the pedal to raise the outer end, the rod or link 60 then swings the arm 61 and turns the control shaft 62 sufficiently to raise arm 72 to release pressure upon the steam valve opening bar 50 and to throw the arm 65 of the motor control switch 39 to the reverse setting, and to move cam 70 to a position to release the brake band or shoe 66 from the brake drum 67. As the motor 37 operates in reverse, drive shaft 38 imparts reverse turning movement to driven shaft 41, and the pinion 44 meshing with the toothed portion 22 of rack bar 19 will cause this rack bar to be moved back a sufficient distance to release the wheel 105 from the cam bar 101, after which the springs 107 will raise these parts and the pressure bar 85 to the full line position of Figure 1 and the dotted line position of Fig. 4, where drawing force is removed from the link or rod 81 and the arm 25 is swung up by the spring 29 to raise the pressing iron 10 from the material or garment supported and held upon the pressing buck 7. When the bar 19 has traveled back or upon its return movement a sufficient distance to cause spring 90 to move the body portion of the carriage 13 and draw the toggle link 86 away from the trip bar or arm 89, the spring 88 will cause this toggle link 86 to move the latch member 83 downwardly into the recess 82 and the rack bar and the body portion of the carriage will then be locked to travel in unison.

As has been stated above, the moistening valve opening bar 50 is released and the springs 53 raise this bar so that it is entirely out of contact with the roller 54, in consequence of which the moistening steam valve remains closed during the return movement of the carriage.

As the carriage approaches the extreme of its return movement, it is necessary that means be provided to stop movement of the carriage and the motivating parts, and I therefore provide an arm 108 pivoted to be swingably mounted in the path of movement of the roller 105 upon its return movement. This arm 108 cooperates with a cross lever 109 to engage and swing an arm 110 on the shaft 62, which arm 110 when swung moves the shaft 62 to a position to swing the arm 65 of the switch 39 to the off position and to move the cam 70 of the brake mechanism to a position to permit the brake shoe or band 66 to engage with the drum 67 and stop rotation of the drive shaft, and consequently stop movement of the parts. If desired, a spring bumper 111 can be provided at the return end of the frame to cushion any return impact of the carriage, and to thus relieve possible strain upon the rack 22, the pinion 44, and associated parts.

As the operation and function and use of the parts has been quite fully set forth in connection with the detailed description of the mechanism, it is believed that the purpose and operation and use of the machine will be fully understood.

This machine and mechanism is admirably adapted for use in carrying out the method of my invention, and this method consists broadly in pressing a seam by opening and smoothing the edges of the material at the seam from the line of stitching, moistening the material substantially along the line of the seam, and applying heat and direct static or stationary pressure to dry and set the material.

From the foregoing it will be seen that I have provided a machine and method which permits the operator to have free use of both hands for adjusting, manipulating and handling the material or garment and for properly placing and locating the seamed portion, and with which the pressing operation is accomplished by direct static and immovable or stationary pressure, thus greatly increasing the efficiency of the machine and the operation, and saving time and cost in the operation.

While I have herein shown and described only certain specific constructions and arrangements of the mechanism and have set forth only certain possible steps in the method, it will be appreciated that changes and variations can be made to suit different requirements of use without departing from the spirit and scope of my invention.

I claim:

1. A machine for pressing seams comprising, a support to receive and hold the seamed material to be pressed, a heated pressing means movable to travel in a line along the length of said support and separated from pressing contact therewith to smooth back the seamed edges against the body of the material, means to apply moisture along the line of the seam, means to stop travel of said pressing means when the seamed material has been smoothed, means to apply direct pressure to force the stopped pressing means against the material over the seam as held by the support to thus dry and press the material, means to release the pressure upon the pressing means, and means to return the iron to the starting position following the release of the pressure to thus avoid sliding the iron over the goods.

2. A machine for opening and pressing seams comprising, an elongated buck having one end extending to receive and hold the seamed material to be pressed, an elongated pressing iron movable to travel along the length of said buck with a pressure insufficient for finished pressing and yet sufficient to open out and smooth back the seamed edges against the body of the material, means to apply moisture directly along the line of the seam, means to stop travel of said iron when the seam has been opened and moistened, means to stop the application of moisture, means to apply direct pressure to force the stopped iron against the material having the open seam supported by the buck to thus press the material, means to release the pressure upon the iron, and means to return the iron to the starting position following the release of the pressure to thus avoid sliding the iron over the goods.

3. A machine for pressing seams comprising, a support to receive and hold the seamed material to be pressed, a heated pressing iron movable to travel above and in a direct line along the length of and out of pressing contact with said support to spread and smooth back the seamed edges against the body of the material, means to apply moisture along the line of the seam as opened, means to stop travel of said iron when the seam has been opened and moistened, means to apply direct pressure to force the stopped heated iron down against the material and upon the seam as held by the support to thus dry and press the material, and means operable to bodily lift the iron from contact with the goods upon completion of the pressing operation.

4. A machine for opening and pressing seams in trousers legs and the like comprising, an elongated support to receive and hold the seamed leg with the seamed edges disposed outwardly and extending longitudinally, a heated pressing iron movable to travel in a line along the length of said support, means to hold said iron in position during such travel to open out and smooth back the seamed edges against the body of the material, means to progressively apply moist steam along the line of the seam during the opening step, means to stop travel of said iron when the seam has been opened and moistened, means to stop application of steam, means to apply direct downward pressure to force the stopped iron against the material over the open seam as supported by the buck to thus dry and press the material, means operable to release the pressure from the iron, means to raise the iron bodily from pressing contact with the material, and means to return the iron to the starting position following the raising of the same to thus avoid sliding the iron over the goods.

5. A seam pressing machine comprising, an elongated stationary heated support to receive the material to be pressed and to support the same with a two edged seam uppermost and longitudinally disposed, an elongated iron movable longitudinally in proximity to said support and in line with the direction of the extent of the seam, means to move said iron along the length of the seam to spread and open the edges of the seamed material and smooth the same down upon the body of the material on opposite sides of the line of stitching, means to supply heat to said iron, means associated with said iron to moisten the material along the line of stitching progressively as the iron travels and spreads the seamed edges, and means to apply direct and static pressure through the heated iron directly upon the material at the opened and smoothed and moistened seam to dry and press the material.

6. A seam pressing machine comprising, a heated elongated stationary supporting buck to receive and hold the material to be pressed and to support the same with a two edged seam uppermost and longitudinally disposed, an elongated heated iron movable longitudinally in line with the direction of the extent of the seam, means to move said iron along the length of the seam with a pressure insufficient for finished pressing to open and spread the edges of the seam and smooth the same down upon the body of the material on opposite sides of the line of stitching as the iron is moved, means to supply heat to said iron, means to supply heat to the supporting buck, means associated with said iron to moisten the material along the line of stitching as the iron travels and spreads the seamed edges, means to stop the moistening operation, means to apply direct and static pressure through the heated iron directly upon the material at the opened and smoothed and moistened seam to dry and press the material, means to lift and thus directly release the pressure of the iron, and means to return the released iron to the starting position.

7. A machine for pressing the longitudinal seams of trousers legs and the like comprising, an elongated supporting buck to receive and hold the seamed material with the edges of the seam extending longitudinally thereof and presented upwardly, an elongated hollow iron movable longitudinally of and above the buck and thus substantially in line with the line of stitching of the seamed material supported thereon and also movable upwardly and downwardly away from and toward said support, means to move said iron in forward seam opening travel along the length of said support to enter between the edge of the seamed material to open the seam and smooth back said edges without applying finishing pressing force, means to supply moisture through the forward end of the pressing face of said iron during the forward travel to thus moisten the material along the line of stitching as the seam is opened, means to stop the forward travel of the iron upon completion of the seam opening movement, means to stop the supply of moisture, means to supply steam to said hollow iron to heat the iron, and means to move said iron toward the support to apply pressure to clamp the stopped iron tightly against the opened seamed material as held by the support.

8. A machine for pressing the longitudinal seams of trousers legs and the like comprising, an elongated support to receive and hold the seamed material with the edges of the seam extending longitudinally thereof and presented outwardly, an elongated iron movable longitudinally of the support and thus substantially in line with the line of stitching of the seamed material supported thereon and also movable upwardly and downwardly away from and toward said support, means to move said iron in forward seam opening travel over the length of said support to enter between the edges of the seamed material to open the seam and smooth back said edges without applying pressing force, means to supply moisture during the forward travel of the iron to thus moisten the material along the line of stitching as the seam is opened, means to cut off the supply of moisture when the iron has reached its full forward travel, means to stop the forward travel of the iron upon completion of the seam opening movement, means to apply direct pressure to clamp the stopped iron tightly against the opened seam of the material as held by the support, means to release the pressure, and means to return the iron to the starting position following completion of the pressing operation and release of the pressure.

9. A machine for pressing seams comprising, an elongated support to receive and hold the material to be pressed, an elongated hollow iron provided with steam escape passages through the forward end of the pressing face, a steam supply connection to said iron, means to move said iron forward longitudinally slightly above the support and to stop the forward movement when said iron is above said support, means to open the steam escape passages at the beginning of the forward movement and to close said passages at the advanced end of the forward movement, and means to move the stopped iron into pressing relation to exert direct pressure at the end of the forward movement.

10. A machine for pressing seams comprising, an elongated support to receive and hold the material to be pressed, an elongated hollow iron having steam escape passages through the pressing face adjacent to its forward end, a steam supply connection to said iron, means to move said iron forwardly longitudinally slightly above the support to spread and smooth down the seamed edges of seamed material held on the elongated support, means to open the steam escape passages at commencement of the forward movement of the iron and to close said passages at the advanced end of the forward movement, means to stop forward movement of said iron when the iron has moved to a position to bring the major portion of its length above said support, means to move the stopped iron bodily downwardly into pressing relation to exert direct pressure upon the material held by the support after forward movement of the iron is stopped, means to release the pressing force upon the iron, and means to return the iron in reverse travel to its starting position.

11. A machine for pressing seams comprising, an elongated hollow support to receive and hold the material to be pressed, an elongated hollow iron having steam escape passages through the pressing face adjacent to its forward end, a steam supply connection to said iron, a steam supply connection to said hollow support, means to move said iron forwardly longitudinally slightly above the support to spread and smooth down the seamed edges of seamed material held on the elongated support, means to open the steam escape passages at commencement of the forward movement of the iron and to close said passages at the advanced end of the forward movement, means to stop forward movement of said iron when the iron has been moved to bring its length over and above said support, means to move the stopped iron bodily downwardly into pressing relation to exert direct pressure upon the material held by the support after forward movement of the iron is stopped, means to release the pressing force upon the iron, means to return the iron in reverse travel to its starting position, and foot operated control means to actuate the parts to initiate forward and reverse travel of said iron.

12. A garment seam pressing machine comprising, an elongated supporting frame, an elongated hollow pressing buck fixedly carried at one end of the frame with one end thereof extending to receive and support a part of a seamed garment such as a trousers leg, a carriage movably mounted to travel longitudinally on said frame, an elongated pressing iron mounted upon the carriage at an elevation above the pressing buck and independently movable to raised and lowered positions, means to move said carriage to position the iron over the pressing buck, means to supply moisture to a garment supported on the pressing buck during forward movement of the iron, means to supply heat to the iron and the pressing buck, means to stop movement of the carriage when the pressing iron is over the pressing buck, means to directly lower the pressing iron upon the pressing buck to exert pressing force upon seamed material supported by the pressing buck, means to raise said pressing iron from the pressing position upon completion of the pressing operation, and means to move the carriage rearwardly to withdraw the pressing iron from its position of proximity to the pressing buck.

13. A garment seam pressing machine for opening and pressing long seams in the legs of trousers and the like comprising, an elongated supporting frame, trackways mounted longitudinally on said frame, an elongated work supporting pressing buck carried at one end of the frame and having a portion thereof extending to have the seamed leg of the trousers or other garment fitted thereon with the seamed edges presented outwardly, a carriage movable upon said trackways, an elongated hollow pressing iron mounted upon said carriage at an elevation above the pressing buck, steam supply connections to said iron, said iron having steam escape openings through the pressing face thereof at its forward end, motor means to move said carriage along the trackways to cause forward travel of said carriage to move said iron to a position over the pressing buck, means operable upon movement of the carriage to open the steam passages and to close the same at the end of the forward movement of the iron, means to stop movement of the iron when said iron has been brought to a position with the greater portion of its length over the pressing buck, said iron being movably mounted upon the carriage, means to lower the pressing iron against the pressing buck after the forward movement of the iron has been stopped to thus exert direct pressing pressure through the iron, manually actuatable means to release the pressing pressure upon the iron, and means to reverse the motor means to move said carriage to return the pressing iron to its starting position.

14. A machine for pressing seams comprising, a support to receive and hold the seamed material to be pressed, a heated pressing iron movable to travel above and in a direct line along the length of and out of pressing contact with said support to spread and smooth back the seamed edges against the body of the material, means to stop travel of said iron when the desired length of the seam has been opened, means to apply direct pressure to force the stopped heated iron down against the material and upon the seam as held by the support to thus press and set the material, and means operable to bodily lift the iron from contact with the goods upon completion of the pressing operation.

15. A machine for pressing seams comprising, a supporting frame, an elongated work support carried at one end of the frame and having an end extending longitudinally of the frame to receive and hold the seamed material to be pressed, a carriage movably mounted for longitudinal travel on said frame in a line substantially parallel with the longitudinal extent of the work support, an elongated heated pressing iron supported by the carriage at an elevation above the work support and movable to raised and depressed positions, means to move said carriage to carry the pressing iron to travel above and in a line along the length of and out of pressing contact with said support to spread and smooth back the seamed edges against the body of the material, means to stop travel of said carriage when the seam has been opened to the desired length, means to directly lower and depress the heated pressing iron to force the stopped heated iron down against the material and upon the seam as held by the work support to thus flatwise press and dry the material, means operable to bodily lift the iron from contact with the goods upon completion of the pressing operation, and means operable to move the carriage back to longitudinally withdraw the iron from proximity to the work support when thus raised.

SALVATORE CHINNICI.